(12) United States Patent
Hewes et al.

(10) Patent No.: US 6,232,749 B1
(45) Date of Patent: May 15, 2001

(54) BATTERY PACK

(75) Inventors: Jeffrey Hewes, Holliston, MA (US);
Robert Yoppolo, Woonsocket;
Matthew P. Hull, Jamestown, both of RI (US)

(73) Assignee: The Gillette Company, Boston, MA (US)

(*) Notice: Subject to any disclaimer, the term of this patent is extended or adjusted under 35 U.S.C. 154(b) by 0 days.

(21) Appl. No.: 09/459,196

(22) Filed: Dec. 10, 1999

(51) Int. Cl.[7] .................................................. H02S 7/00
(52) U.S. Cl. ................................................... 320/135
(58) Field of Search ................................. 320/135, 136, 320/107, 112; 307/66, 150, 151

(56) References Cited

U.S. PATENT DOCUMENTS 5,323,100 * 6/1994 Iketani ................................. 320/135
5,945,806 * 8/1999 Faulk ................................... 320/127
5,990,664 * 11/1999 Rahman ............................... 320/136

* cited by examiner

*Primary Examiner*—Peter S. Wong
*Assistant Examiner*—Gregory J Toatley, Jr.
(74) *Attorney, Agent, or Firm*—Fish & Richardson P.C.

(57) ABSTRACT

A battery pack is described. The battery pack includes a DC to DC converter and a group of at least two primary cells. The DC-DC converter is operatively coupled to the group of primary cells. The group of primary cells have an initial voltage that is higher than a rated voltage for the battery pack. The DC-DC converter converts the voltage to a regulated nominal voltage that is lower that the rated voltage of the group of primary cells. By regulating the battery voltage down to a constant voltage, the cells can discharge down to a minimum voltage level per cell enabling additional energy transfer from the group of cells.

17 Claims, 6 Drawing Sheets

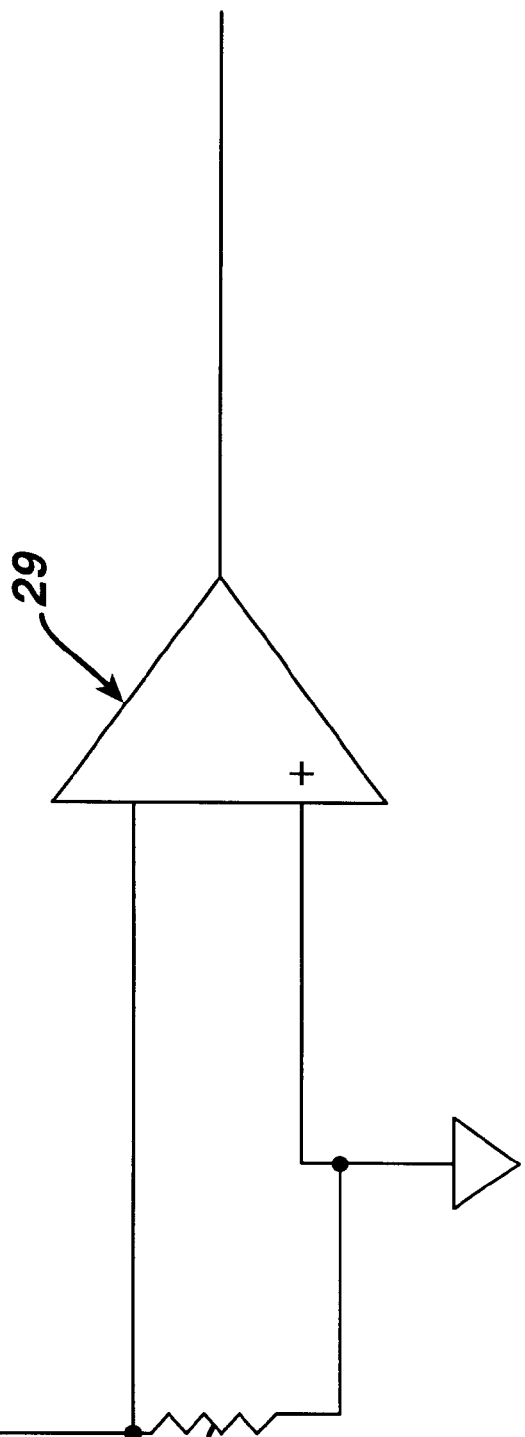

BATTERY PACK

This invention is related to battery packs.

Currently battery packs use rechargeable batteries such as lithium ion or nickel cadmium batteries to power electronic devices such as camcorders and cell phones. Other types of rechargeable batteries include nickel metal hydride batteries. These batteries tend to be expensive and sometimes not convenient. There exists some refillable battery packs with primary cells, i.e., that accept alkaline cells and are used to power both camcorders and cellular telephones.

SUMMARY

According to an aspect of the invention, a battery pack includes a DC to DC converter and a group of at least one primary cell coupled to the DC-DC converter.

The battery pack has a step down DC-DC converter. The group of primary cells comprise a plurality of cells coupled in series. The DC-DC converter includes a controller and an externally coupled switching transistor. The battery pack has the DC-DC converter with an input coupled to one terminal of the group of cells and an output that forms one of the terminals of the battery pack. The group of primary cells can be replaceable or non-replaceable. The battery pack includes a case that houses the DC to DC converter and group of primary cells. The primary cells can be configured in a parrallel combination and used with a step up converter to provide a higher voltage output.

One or more of the following advantages may be provided by one or more aspects of the invention.

This invention provides a battery pack including primary cells such as alkaline cells and other types of primary cells such as lithium manganese dioxide. Primary battery cells are not rechargeable. The battery pack includes a grouping of primary cells held in a cartridge and a DC to DC converter.

The DC-DC converter in the battery pack extracts additional energy from the primary e.g., alkaline cells. The DC to DC converter accepts an input voltage and produces a different, generally lower output voltage. Generally a "step down voltage converter" is used to produce the lower voltage. For other applications, a step up or boosting type converter can be used.

BRIEF DESCRIPTION OF THE DRAWINGS

FIG. 5 is a block diagram of a battery pack that has an anti-charge circuit built in.

FIG. 5A shows an embodiment of a signal detector circuit for the anti-charge circuit.

DETAILED DESCRIPTION

Figure 1:
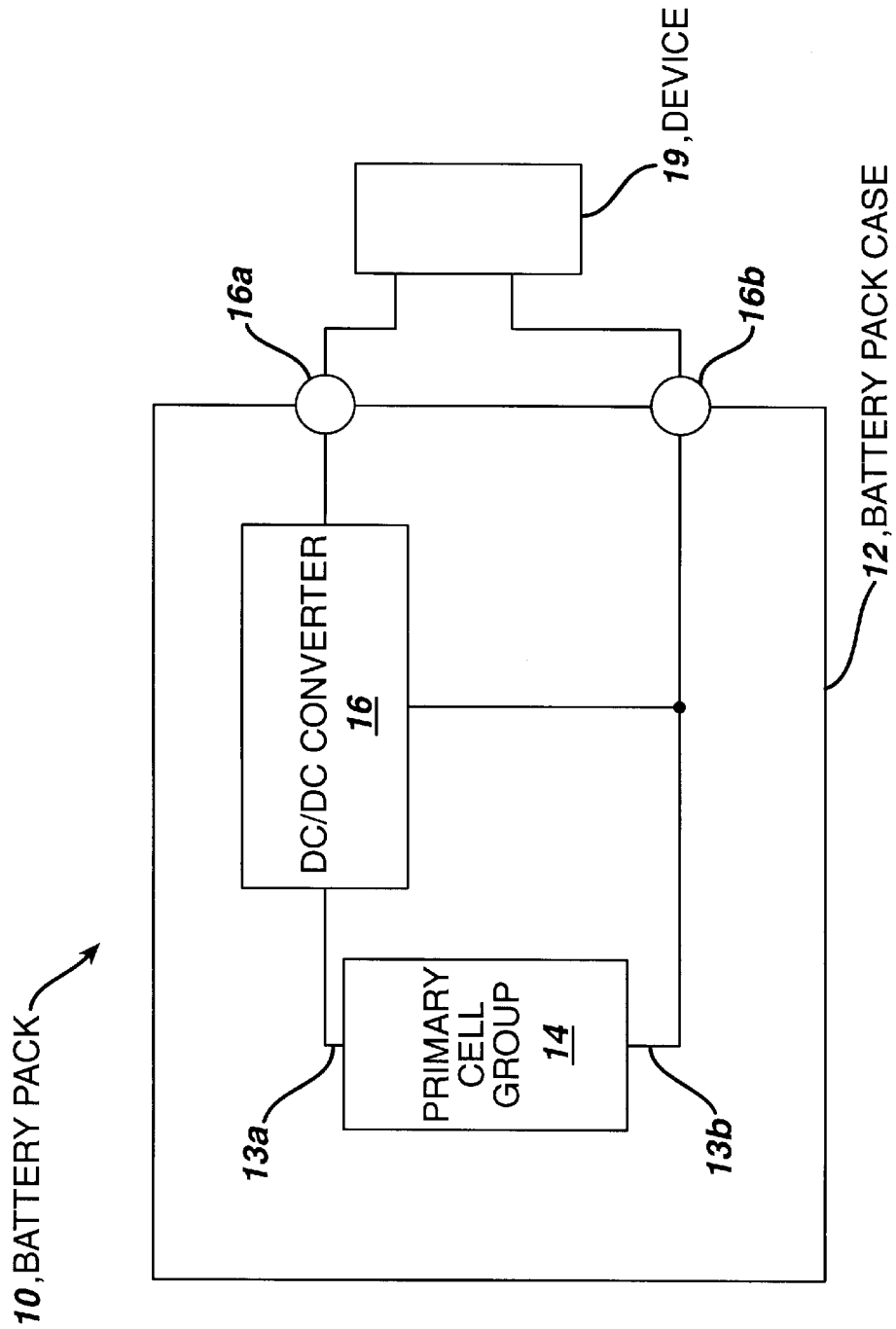
FIG. 1 is a block diagram of a battery pack.

FIG. 1 shows a battery pack 10 including a battery pack case 12 and a collection or group of primary cells 14 that are connected either in series or parallel, or as a combination of a series-parallel connection. The battery pack case 12 is represented as a box but in an actual embodiment would include a housing e.g., of plastic, having a compartment to house the group of primary cells 14 and internal electrodes (not shown) to connect the group of primary cells 14 in an appropriate manner to external electrode connections represented as 16a, 16b of the battery pack case 12. The group of primary cells 14 can be arranged in the battery pack case 12 in a manner where they are replaceable or not replaceable.

The group of primary cells 14 include a plus terminal and a minus terminal 13a, 13b. The plus terminal 13a of the group of primary cells 14 is connected to an input side of a DC to DC converter 16. The DC-DC converter 16 acts as a voltage regulator for the voltage from the group of primary cells 14. The output of the DC to DC converter has two terminals e.g., a plus and a minus output that connect to a device 19 e.g., camcorder or cellular telephone, etc. The primary cells discharge through the DC to DC converter. The DC-DC converter 16 provides a regulated e.g., relatively constant output voltage to the device 19 being powered, while the cells are drained of voltage potential from an initial voltage to a terminal voltage of the primary cells.

For example, a device 19 such as a cellular telephone can operate at a nominal 3.6 volts, in a range of 3.15 volts to 5.6 volts. It is difficult to connect a set of alkaline cells in such a way to efficiently use the cells over that voltage range. For example, if three cells are connected in series (nominal total initial voltage of 4.5 volts), the cellular telephone will not be able to use the maximum capacity of the cells because the phone will shut off at 1.05 volts per cell. At this voltage level there is still significant energy left in each of the primary cells. On the other hand with four (4) primary cells connected in series, the total voltage from the cells (nominal total initial voltage of 6.0 volts) will exceed the 5.6 volt limit for the phone.

The DC to DC converter 16 addresses both the upper and lower limit voltage problems. The DC to DC converter can be used to regulate the output voltage from e.g., five (5) triple A size cells connected in series. The DC-DC converter 16 converts the voltage to a regulated 3.6 volt nominal voltage. The DC-DC converter 16 prevents excessive voltage from appearing at the terminals and by regulating the battery voltage down to a constant 3.6 volts, the cells can discharge down to a voltage level of about 0.7 or 0.8 volts per cell before the DC-DC converter will cut out thereby enabling the maximum amount of energy transfer from of the cells. The battery pack can have an extra cell and discharge the cells down to a lower voltage. The cutoff voltage for each cell is arrived at by dividing the device cutoff voltage by the number of cells.

Alkaline cell discharge efficiency benefits from low power drain. That is, more energy can be removed from a cell discharged at a low rate compared to a high discharge rate. Therefore, a high group voltage for the primary cells produces a low current drain and power drain per cell. For a given power requirement, this provides a higher discharge efficiency. The DC to DC conversion allows the group of battery cells to have an initially high voltage compared to the rating of the battery pack, while allowing the DC-DC converter to slowly discharge the cells to a minimum voltage. By discharging at a higher voltage and lower current drain enhances the discharge efficiency of each cell. Adding more cells improves this efficiency.

Figure 2:
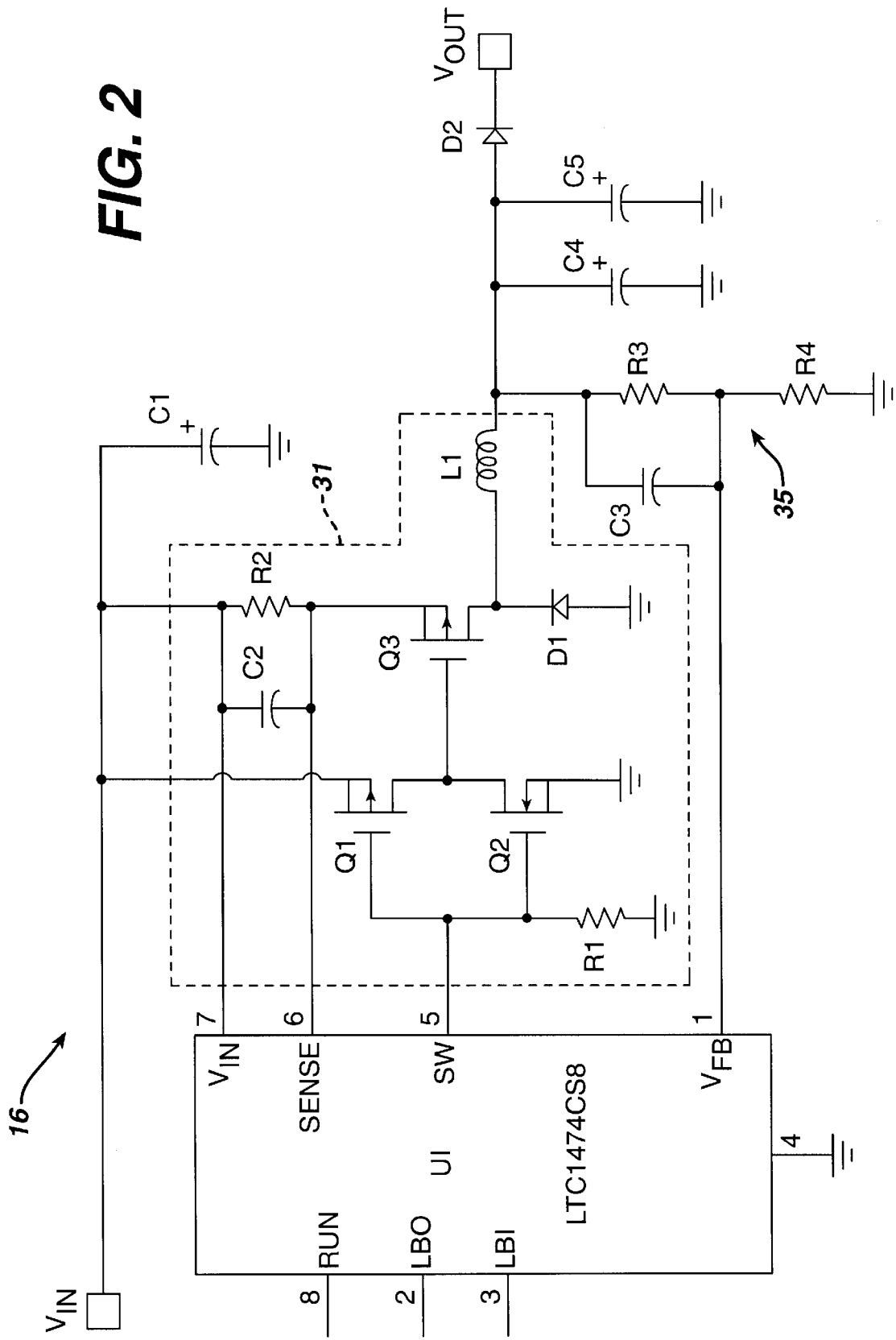
FIGS. 2 and 3 are schematic diagrams of DC-DC converters for use in the battery pack of FIG. 1.

FIG. 2 shows an exemplary DC to DC converter circuit 16. The DC to DC converter includes a controller device U1 from Linear Technology Corporation, Part No. LTC1474. The controller U1 has an internal switch (not shown) and low quiescent current. However, the controller U1 does not have high enough current switching capability to operate devices such as cellular phones and camcorders. Thus, for these applications, the DC-DC converter also includes an external switching arrangement, 31 comprised of external transistors, Q1, Q2 and Q3. The external transistors enable the DC-DC converter to switch higher currents. For applications such as powering camcorders and cellular telephones, the battery pack typically needs to provide up to 0.7 or 0.8 amps continuous current at the rated voltages.

The DC-DC converter also includes an inductor L1 and capacitors C4 and C5 to provide a low pass filter 33. The terminal Vin receives the voltage from the battery cells. In this example, the battery cells include five (5) AAA cells connected in series. The 5 cells produce a nominal initial output voltage of 7.5 volts. With the DC-DC converter, the battery pack 10 can output a constant voltage, e.g., 3.6 volts. The use of the DC-DC converter 16 extends the usable voltage of each of the primary cells. Therefore the usable life of the group of primary cells 14 is extended down to a voltage of about 4 volts.

The DC-DC converter 16 circuit senses a voltage at the terminal of L1. The inductor L1 in combination with resistors R3, R4 forms a voltage divider 35. A generated reference voltage in converter controller U1 is compared to a voltage across R4 combination that is fed back to a terminal Vfb. The controller U1 maintains a constant output voltage at the junction between resistors R3 and R4. That output voltage maintains a constant voltage at Vout. The controller causes the input voltage to be chopped by the transistor Q3 which turns off and on (by operation of transistors Q1 and Q2) at a periodic rate. The chopped signal which appears to the left side of L1 is applied to the low pass filter 33 to filter out AC components of the signal and provide a smooth, D.C. output voltage on terminals 16a, 16b.

The DC-DC converter 16 is a step down converter. When Q1 turns on it starts charging inductor L1 through Q3. Inductor L1 stores energy in the circuit and discharges the energy when transistor Q3 turns off. The inductor L1 discharges through the diode D2 through the load to the Vout terminal. The DC-DC converter reduces the input voltage down to a lower output voltage Vout while the controller U1 maintains the proper duty cycle or a combination of duty cycle and switching frequency to switch transistor Q3 to maintain a constant DC output voltage at Vout. A CMOS arrangement of transistors Q1–Q3 is used to minimize quiescent current.

Figure 3:
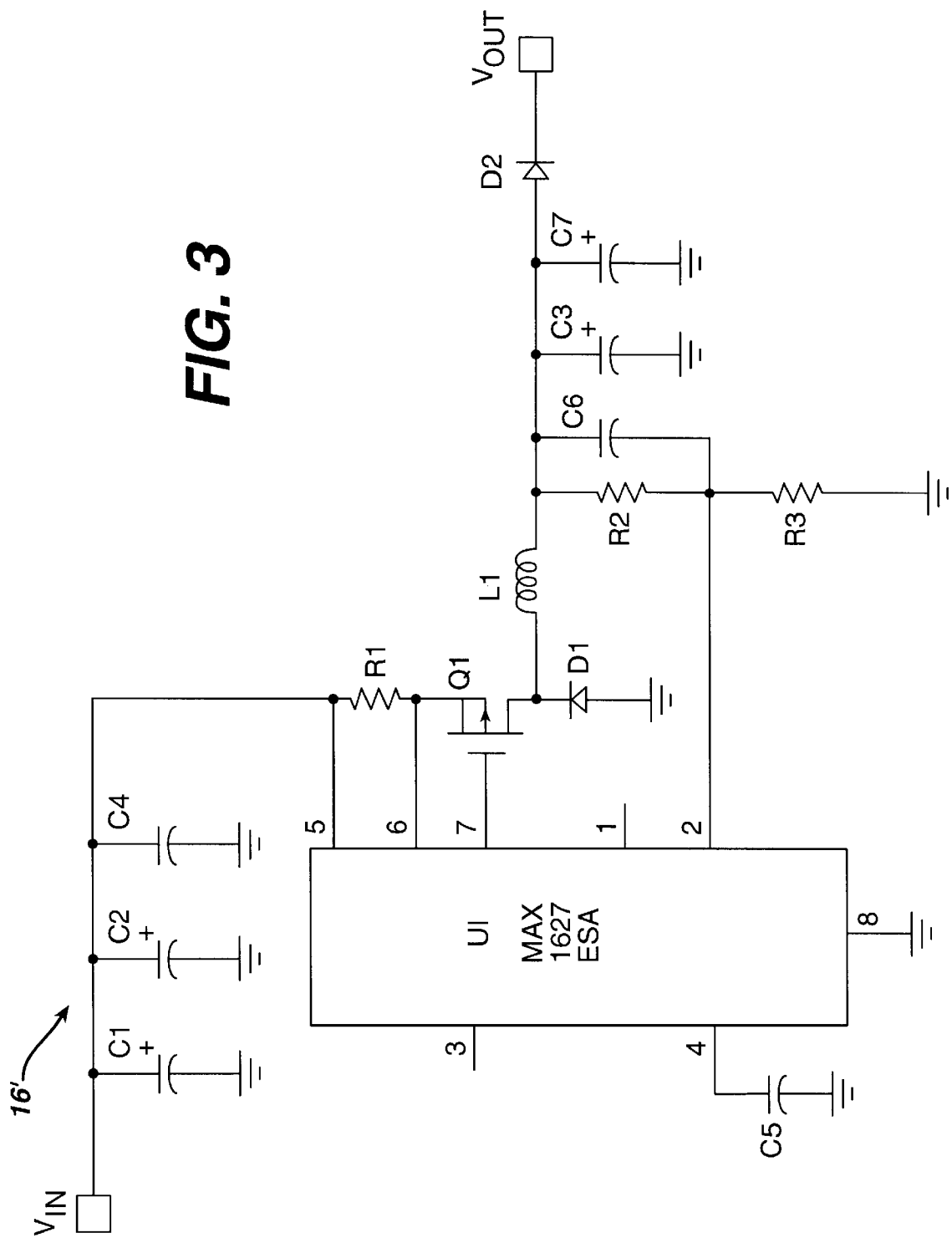

FIG. 3 shows an alternative DC-DC converter circuit 16' that has high efficiency, low noise, good transient response, but a relatively high quiescent current (e.g., a couple hundred microamps). This DC-DC converter circuit 16' is less desirable. Ideally the DC-DC converter should have a vanishingly small amount of quiescent current drain. This DC-DC converter circuit 16' can meet the power conversion requirements of typical applications. This DC-DC converter circuit 16' is also a step down converter. The DC-DC converter circuit 16' takes the applied input voltage and chops it through the transistor Q1 and charges up inductor L1. The combination of inductor L1 and the capacitor C3, C7 act as a filter that filters out the AC component and provides a DC voltage.

The DC-DC converter circuit 16' has a similar feedback connection back to a controller U2 as converter 16 (FIG. 3), here from the connection between resistors R2 and R3. The converter acts as a switching regulator that ratios the input voltage down in a controlled manner to provide a regulated DC output voltage. The controller U2 can be part number MAX1627 manufactured by Maxim Integrated Products Inc., in Sunnyvale, Calif.

Figure 4:
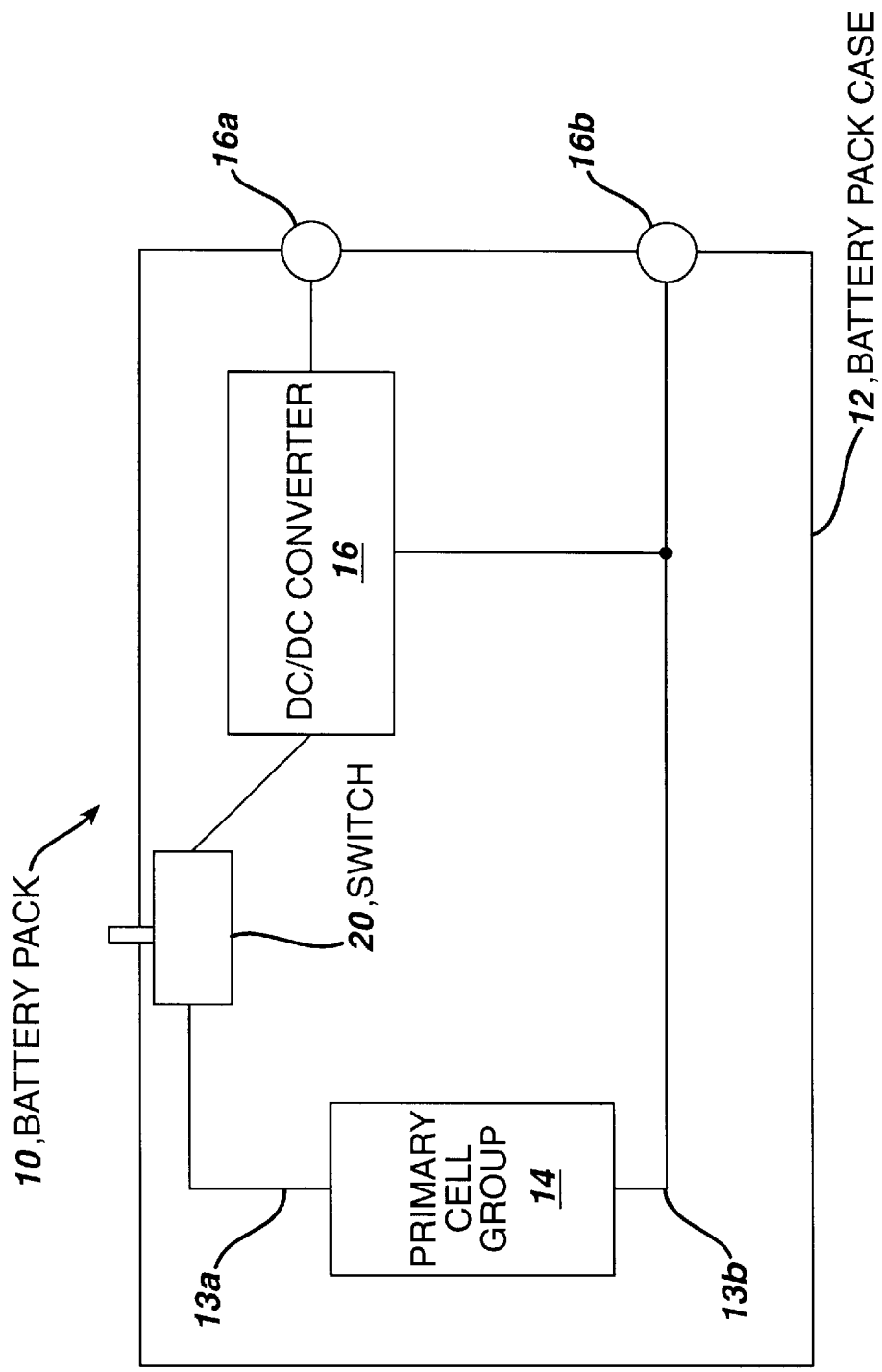
FIG. 4 is a block diagram of an alternative battery pack.

FIG. 4 shows the primary cell group 14 coupled between the plus terminal 13a and the minus terminal 13b. Connected to the plus terminal of the cells is a manually activated switch 20. The other side of the switch 20 is connected to the DC-DC converter 16. The output of the DC to DC converter 16 provides output terminal 16a for the battery pack. The switch 20 can interrupt the connection between the cells to the DC-DC converter 16 to eliminate the drain on the cells which would occur when the battery pack 10 is not in use. The switch 20 could require intervention by the user or it could be designed in such a way that it would function when the battery pack 10 was applied to the device (not shown) being powered.

Figure 5:
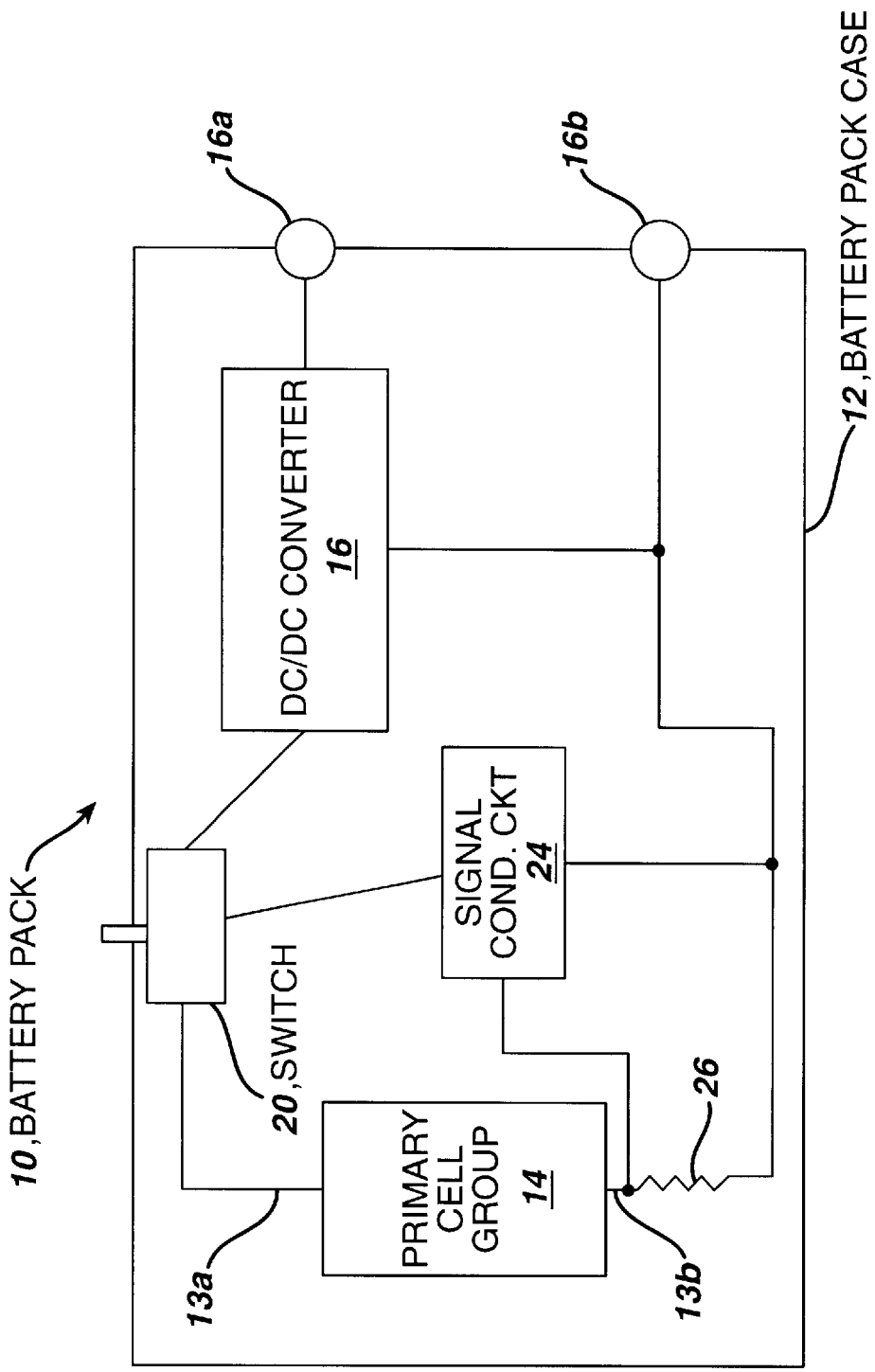

FIG. 5 shows a collection of primary cells connected to an anti-charge circuit 21 to prevent unwanted charging of the primary cells 14. The anti-charge circuit 21 includes a switch 20' that is activated by a signal conditioning circuit 24. The signal conditioning circuit 24 detects the presence of a reverse current through the alkaline cells. If that condition is detected, the signal conditioning circuit 24 opens the connection between the cells and the DC to DC converter. The purpose of this switch 20' would be for safety. In many applications that use rechargeable batteries there is the possibility for hooking up the primary battery pack to a device that has a charging circuit that is intended to charge rechargeable cells. Primary cells such as alkaline cells are not rechargeable and attempting to recharge them can be dangerous. The signal conditioning circuit 24 could either have a manual reset 27 (as shown) or an automatic reset that is triggered when the charging current disappears.

The anti-charge circuit 21 senses a voltage across resistor 26. The voltage could be amplified and used to trip a comparator 29 (FIG. 5A) that provides a driver for the switch. 20' The signal conditioning circuit 24 and switch 20' could be included as part of the DC to DC converter. Ideally all of the integrated circuits are based on CMOS technology for low power consumption.

At the power levels required to be switched by the DC-DC converter, e.g., about 2–3 watts, the switching transistors could be separate from the controller. Also, the capacitance and the inductance required for the amount of energy to be stored, could be implemented as discrete capacitor and inductor devices.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A battery pack having an nominal output voltage rating, comprises:
    a group of primary cells, the group of cells having a nominal voltage rating that is in excess of the nominal voltage rating of the battery pack;
    a DC to DC converter, the DC to DC converter configured to discharge the group of cells down to a voltage level of about the terminal voltage of cell, before the DC-DC converter cuts out, enabling a maximum amount of energy transfer from the cells, with the group of primary cells coupled to discharge through the DC to DC converter.

2. The battery pack of claim 1 wherein the group comprises:
    at least two cells, and wherein the DC-DC converter is a step-down converter.

3. The battery pack of claim 2 wherein the group of primary cells comprise:

a plurality of cells coupled in series.

4. The battery pack of claim 1 wherein the DC-DC converter comprises:

a controller device for current switching and an externally coupled switching transistor, arranged to switch high levels of current from the battery in accordance with a load placed on the battery.

5. The battery pack of claim 1 wherein the DC-DC converter has an input coupled to one terminal of the group of primary cells and an output that forms one of the terminals of the battery pack.

6. The battery pack of claim 1 wherein the group of at least one primary cell is replaceable.

7. The battery pack of claim 1 wherein the group of at least one primary cell is not replaceable.

8. The battery pack of claim 1 further comprising:

a case that houses the DC to DC converter and group of primary cells.

9. The battery pack of claim 1 wherein the DC-DC converter is a step-up converter.

10. The battery pack of claim 2 wherein the group of primary cells comprise a plurality of cells coupled in parallel.

11. A battery pack, comprises:

a DC to DC converter;

a group of at least two primary cells, with the DC-DC converter operatively coupled to the group of primary cells and with the group of primary cells having an initial voltage that is higher than a rated voltage for the battery pack;

case housing the DC-DC converter and the group of primary cells; and a pair of external battery terminals coupled to the DC-DC converter and supported on the case.

12. The battery pack of claim 11 wherein the DC-DC converter converts the voltage of the group of cells to a regulated nominal voltage that is lower that the rated voltage of the group of primary cells.

13. The battery pack of claim 11 wherein the DC-DC converter prevents excessive voltage from appearing at terminals of the battery pack.

14. The battery pack of claim 11 wherein by regulating the battery voltage down to a constant voltage, the cells can be discharged down to a minimum voltage level per cell.

15. The battery pack of claim 14 wherein at the minimum voltage level per cell the DC-DC converter will cut out.

16. The battery pack of claim 15 wherein discharging down to a minimum voltage level per cell enables additional energy transfer from the group of cells.

17. The battery pack of claim 16 wherein the group of primary cells include a plus terminal and a minus terminal with the plus terminal of the group of primary cells connected to an input side of the DC to DC converter.

* * * * *

UNITED STATES PATENT AND TRADEMARK OFFICE
CERTIFICATE OF CORRECTION

PATENT NO. : 6,232,749 B1
DATED : May 15, 2001
INVENTOR(S) : Jeffrey S. Hewes, Matthew P. Hull and Robert Yoppolo It is certified that error appears in the above-identified patent and that said Letters Patent is hereby corrected as shown below:

Title page,
References Cited, 5,323,100 delete [6/1994] and insert -- 7/1994 --

Signed and Sealed this

Twenty-second Day of January, 2002

Attest:

JAMES E. ROGAN
*Attesting Officer*     *Director of the United States Patent and Trademark Office*